United States Patent [19]

O'Toole

[11] Patent Number: 5,579,721
[45] Date of Patent: Dec. 3, 1996

[54] INTEGRATED HOLDER/SIFTER FOR HANDLING LITTER

[76] Inventor: John T. O'Toole, 5125 Durnham Dr., Waterford, Mich. 48327-3111

[21] Appl. No.: 488,690

[22] Filed: Jun. 8, 1995

[51] Int. Cl.⁶ .................................................. A01K 29/00
[52] U.S. Cl. ............................................ 119/166; 209/417
[58] Field of Search .................................. 119/166, 165; 209/417, 702, 252, 235

[56] References Cited

U.S. PATENT DOCUMENTS

| | | | |
|---|---|---|---|
| 1,260,359 | 3/1918 | Frank | 209/417 |
| 4,190,525 | 2/1980 | Menzel | 209/235 |
| 4,222,866 | 9/1980 | Wilson | 209/417 |
| 4,325,325 | 4/1982 | Larter | 119/166 |
| 5,032,254 | 7/1991 | Deboer et al. | 209/10 |
| 5,048,465 | 9/1991 | Carlisi | 209/235 |
| 5,121,712 | 7/1992 | Schulein et al. | 119/167 |
| 5,195,464 | 3/1993 | Mutter | 119/165 |
| 5,220,886 | 6/1993 | Hyde | 119/165 |
| 5,394,833 | 3/1995 | Glass | 209/702 |

Primary Examiner—William E. Terrell
Assistant Examiner—T. Kelly
Attorney, Agent, or Firm—Marc J. Luddy

[57] ABSTRACT

An integrated holder/sifter for cleaning litter comprising: a container; a holding area in the container for receiving litter to be cleaned, and a sifting area containing openings positioned adjacent to the holding area where the container, the holding area, and the sifting area are integrated as a single component.

10 Claims, 3 Drawing Sheets

5,579,721

INTEGRATED HOLDER/SIFTER FOR HANDLING LITTER

BACKGROUND OF THE INVENTION

This invention describes an apparatus and method for the cleaning and recycling of particulate waste collection material. More specifically, the present invention describes a single component, reusable, integrated holder/sifter useful for cleaning animal litter boxes.

FIELD OF THE INVENTION

Not that many years ago, most animals were owned and raised in rural settings and no special attention was paid to containing or collecting their wastes. Their excreta was simply left where if fell to decompose naturally. An exception to this was the collection of wastes that had economic value, for example, from horses and cows, for use as fertilizer.

As society has become more urbanized, we have not lost our need or desire to raise and own animals. Small scale animal operations for research and industry are now found in every urban area. In addition, the keeping of household pets, such as cats and dogs, is widespread.

The waste from urban animals is generally collected in an absorbent material of some kind. This absorbent material is frequently called litter. Such litter is also frequently used to absorb all kinds of unwanted liquids such as motor oil. (As used herein the term "litter" is used to refer generically to any absorbent material that is used to catch waste of any kind).

Litter is most commonly used with domestic cars. Typically a car uses a flat tray containing litter. Because litter is relatively expensive, it is desirable to remove solid waste frequently and change all the litter in the box on a regular basis. Recently a number of "clumping" litters have been developed. See, for example, U.S. Pat. No. 5,329,880. With "clumping" litter particles that have absorbed urine stick to each other forming a "clump" that can be removed along with solid waste. This makes it possible to remove clumped urine together with feces on a daily basis. Thus, the litter that remains in the pan is clean and changing all the litter in the pan is unnecessary.

A variety of prior art devices have been developed to simplify the removal of solid material (solid waste and/or clumped urine) from the clean litter.

In their simplest form, such devices are no more than scoops of one form or another. With such a device, one must manually and systematically dig through the litter and scoop out the waste.

On the other end of the scale, a variety of mechanisms and means have been described for sifting litter of which the following are representational:

U.S. Pat. Nos. 3,809,013, 4,279,217, and 5,121,712 all describe various systems that use a disposable litter pan liner. The described liners have appropriately sized holes, and when they are removed, clean litter is sifted back into the litter pan.

U.S. Pat. No. 4,190,525 describes a receptacle unit for handling a quantity of cat litter. This unit comprises a screen that automatically sifts the refuse from the litter when the screen is either moved through the litter bed or the litter is dumped on the screen.

U.S. Pat. No. 4,802,442 discloses a cat litter screening device which comprises two perforated bottom panels in the litter pan to sift the litter.

U.S. Pat. No. 4,493,288 describes a device for continuously cleaning the litter by removing used litter automatically as the animal uses the litter box. This patent describes a litter box having a downward sloping conveyor mechanism that forms the bottom of the box and a container for used litter and excrement. The device automatically adds litter to replace the material that is removed.

U.S. Pat. No. 5,032,254 describes a litter cleaning apparatus that comprises a clean litter receptacle, a waste receptacle, and a cleaned litter receptacle. This apparatus is designed to filter waste litter into a clean litter pan.

Nothing in the prior art teaches or suggests a simple inexpensive system for sifting litter. The devices described are complex and correspondingly expensive, they have multiple moving parts, are expensive to manufacture, and undoubtedly would require maintenance on a regular basis. Other devices such as the one described in U.S. Pat. No. 5,032,254 require at least one additional litter pan to sift clean litter into. While the sifting liners described in U.S. Pat. Nos. 3,809,013, 4,279,217, and 5,121,712 are simple, they still require the repeat purchase of additional bags on a regular basis.

SUMMARY OF THE INVENTION

An object of the present invention is a simplified device for sifting litter that is economical to manufacture and purchase, has no moving parts, and does not require multiple containers to operate.

These and other objects of the invention are satisfied by an integrated holder/sifter for cleaning litter comprising: a container, a holding area in the container for receiving litter to be cleaned, and a sifting area positioned adjacent to the holding area.

Another object of the present invention is a method for cleaning a litter pan using the integrated holder/sifter of the present invention comprising the steps of: emptying litter from the litter pan into the holding area of the integrated holder/sifter; positioning the holder/sifter over the emptied litter pan; tilting the integrated holder/sifter so that litter held in the holding area is moved to the sifting area and sifted litter falls through the sifting area into said litter pan.

BRIEF DESCRIPTION OF THE DRAWINGS

The same reference numbers are used to refer to corresponding parts in each of the drawings.

DETAILED DESCRIPTION OF THE INVENTION

Unlike the prior art, the present invention describes on integrated holder/sifter for removing feces or clumped urine from litter. The term "integrated" is used herein to mean a single component device in which a holding area for holding contaminated litter and a sifting area for filtering the litter are arranged adjacent to each other. Inherent in the term "integrated" is the utter simplicity of the present invention. The term "sifting" as used herein to mean sorting, selecting, or separating dissimilar types or sizes of material.

The present invention also differs from the prior art in that if has no moving parts, requires no regular maintenance beyond an occasional washing, and can be inexpensively manufactured in any convenient size. In addition, the sifting operation requires only the integrated holder/sifter of the present invention and the litter pan that contains the dirty litter. Unlike prior art devices, no additional containers are required.

Figure 1:
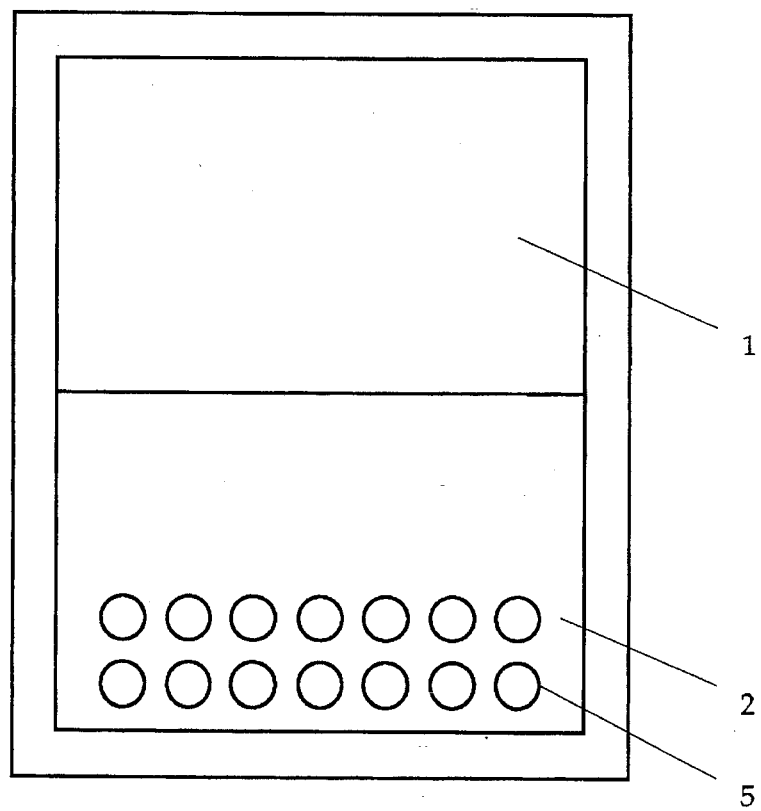
FIG. 1 shows a top view of an embodiment of the present invention.

FIG. 1 shows a fop view of an embodiment of the present invention. This embodiment is illustrated as rectangular in form, however, other shapes are specifically included in the invention (such as that shown in FIG. 5, which is discussed more fully below). By comparing FIG. 1 with FIGS. 2, 3, and 4, if can be seen that the holding area 1 is at an obtuse angle to the sifting area 2.

Figure 2:
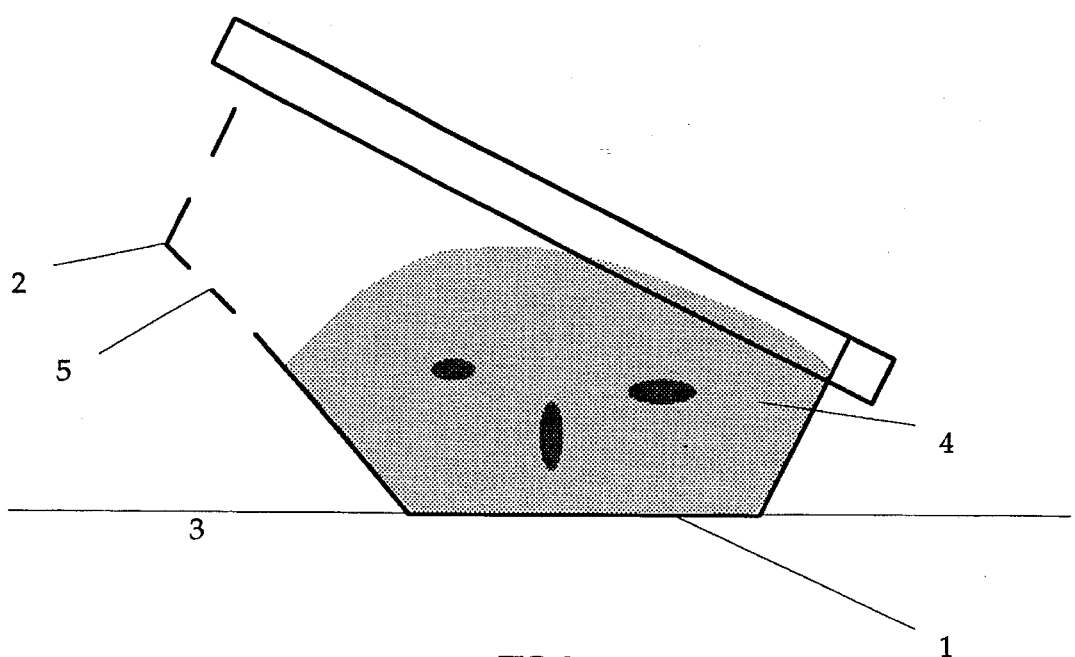
FIG. 2 shows the embodiment of FIG. 1 with contaminated litter occupying the holding position.
Figure 3:
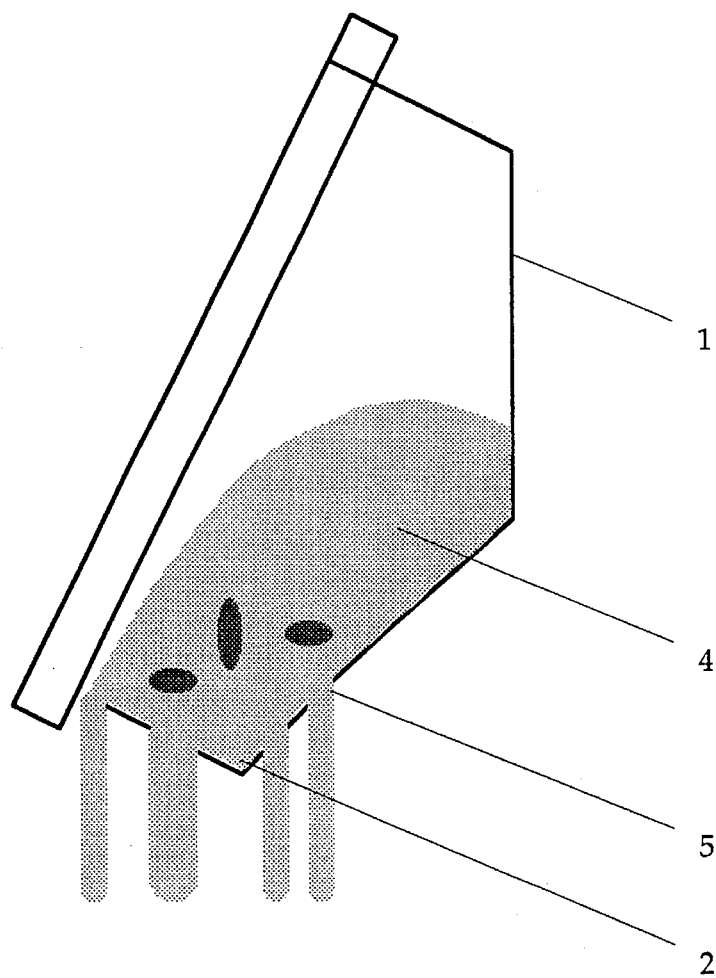
FIG. 3 shows the embodiment of FIG. 1 sifting the litter.
Figure 4:
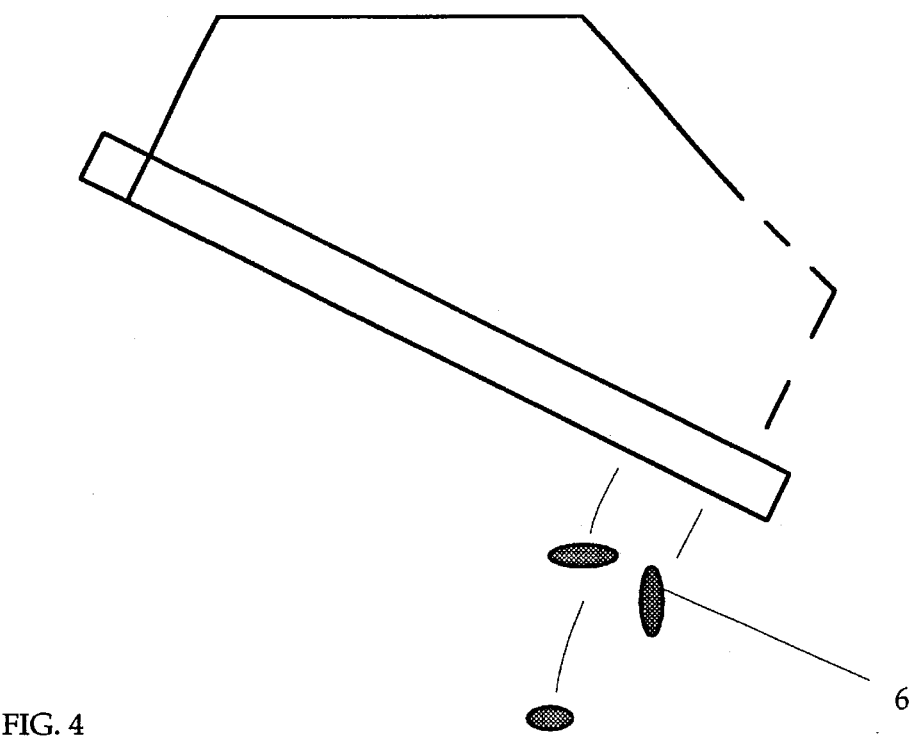
FIG. 4 shows the embodiment of FIG. 1 titled to dispose of the sifted material.

In use, the embodiment of the integrated holder/sifter shown in FIG. 2 is positioned so that the holding area 1 is directly on a flat surface 3 and the sifting area 2 is angled upward. The holding area is sized to contain all the litter in the litter pan. The entire contents 4 of the litter pan containing fecal matter and clumped urine (depending on the type of litter in use) are then poured into the litter pan. The litter pan is then lifted and positioned over the now empty litter pan and tilted as shown in FIG. 3. As a result of this lifting and tilting, the contaminated litter sifts through the openings or perforations 5 in the sifting area 2 into the litter pan. Once all the litter has sifted through the openings or perforations 5 all that remains in the sifting area 2 is the fecal matter and clumped urine 6. As shown in FIG. 4, this remaining material can then be dumped out of the integrated holder/sifter for disposal.

The use of the present invention is a greatly simplified process. It comprises only three steps: 1) dumping the contaminated litter into the sifter, 2) sifting the litter back into the original litter box, and 3) disposing of the fecal matter and clumped urine.

Figure 5:
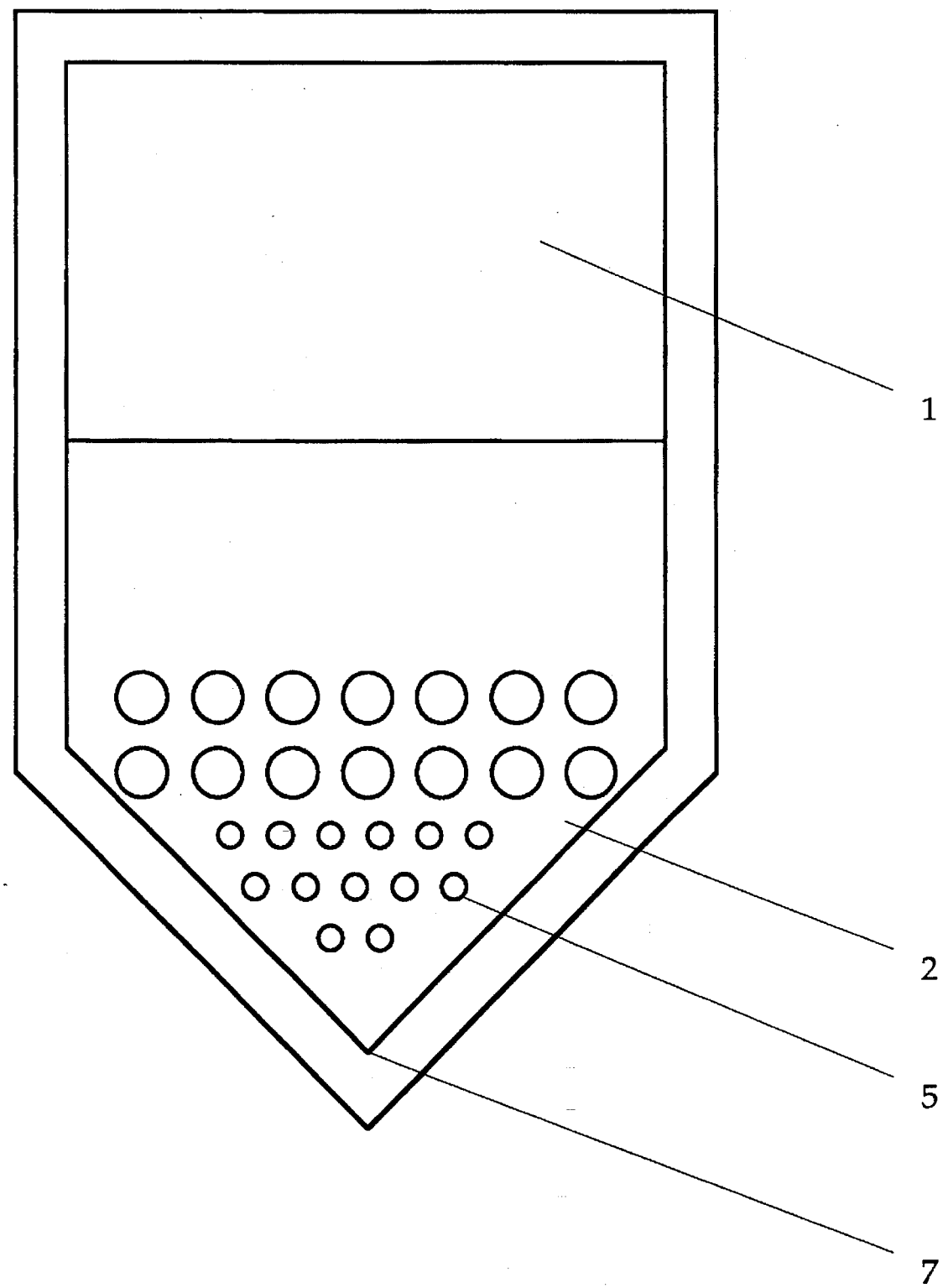
FIG. 5 shows a top view of an additional embodiment of the present invention.

An additional embodiment of the present invention is shown in top view in FIG. 5. In this embodiment, the sifting area 2 is configured to have a gradient of openings or perforations 5 that decrease in size toward the apex 7. This configuration permits a lot of material to be sifted when the contaminated litter is first moved onto the sifting area. The smaller openings or perforations at the apex of the invention permits additional sifting without the risk of pieces of fecal matter or urine clumps that have broken during the sifting being passed through the sifting area into the sifted litter. In addition, because the walls meet at an apex, the waste clumps are concentrated in one area, thereby simplifying their disposal.

One skilled in the art can visualize a number of variations of the configurations described above that are within the scope of the present invention. For example, rather than the rectangular or pentagonal shapes shown in the figures, sifter of the present invention could be circular, oval, or a combination of the two.

The openings or perforations 5 can be sized to conform to particular types of litters. Generally, clumping litter comprises very fine particles and it might be advantageous to reduce the size of the openings or perforations for embodiments intended for use exclusively with such litter. Such custom sizing is by no means necessary. In fact, one of the features of the present invention is its usefulness with all types of litter no matter what the particle size. It has been found that openings or perforations sized from about 0.25 to 2.0 inches are adequate for most litters. Devices having sifting areas fabricated to have openings or perforations of a variety of sizes are also within the present invention.

Inherent is the present invention is a method of using it to sift litter. This method comprises: emptying litter from of a litter pan into the holding area of the invention; positioning the invention over the emptied litter pan; tilting the invention so that litter held in the holding area is moved to the sifting area and sifted litter falls through the invention into the litter pan.

The present invention can be constructed of any convenient material such as nylon, fiberglass, steel, or plastic. A plastic material such as polypropylene or polyethylene is preferred.

Preferable, the present invention is configured so that it can be produced as a single piece using injection molding. Other possible manufacturing processes are stamping, blow molding, vacuum forming, or laminate layup.

The device described herein is discussed primarily as it relates to handling litter for a domestic cat. This is in no way intending to limit the applicability of the invention to the handling of cat litter. Other possible uses are separation of aggregate or scrap products by size, or dimensional sorting of wood chips or other particulate matter.

In addition, the present invention could easily be used for separating large quantities of litter at a work station, such as would be used in a large scale animal breeding or testing facility for cats, mink, rats, mice, etc. Such a work station could consist for example of a cart containing the integrated holder/sift described herein. At each animals cage, the litter would be dumped from the litter pan into the holder and then sifted directly back into the litter pan.

It is to be understood that the present invention is not limited to the sole embodiment described above, but encompasses any and all embodiments within the scope of the following claims.

I claim:

1. An integrated holder/sifter for cleaning litter comprising:
    a rigid molded integrated single component having a base surrounded by walls, said walls joining said base at an obtuse angle, said base having;
    a holding area for receiving litter to be cleaned, and
    a sifting area, said sifting area containing openings positioned adjacent to said holding area.

2. The integrated holder/sifter of claim 1, where said holding area is positioned in a first plane and said sifting area is positioned in a second plane where said first plane and said second plane are positioned at an obtuse angle to each other.

3. The integrated holder/sitter of claim 2, where said holding area and said sitting area are both rectangular in shape.

4. The integrated holder/sifter of claim 2, where said sitting area tapers to an apex at a point farthest from said holding area.

5. The integrated holder/sifter of claim 1, where said openings are from 0.25 to 2.0 inches in diameter.

6. The integrated holder/sifter of claim 1, where said openings comprise a gradient of sizes.

7. The integrated holder/sifter of claim 1, where said integrated holder/sifter is formed from a plastic material.

8. The integrated holder/sifter of claim 1, where said integrated holder/sifter is formed from a plastic chosen from the group consisting of polypropylene and polyethylene.

9. An integrated holder/sifter for cleaning litter comprising:

a container;

a holding area in said container for receiving litter to be cleaned; and a sifting area containing openings positioned adjacent to said holding area, said sifting area tapering to an apex at a point farthest from said holding area;

where said holding area is positioned in a first plane and said sifting area is positioned in a second plane and said first plane and said second plane are positioned at an obtuse angle to each other; and said openings are arranged in a gradient of sizes with the largest perforation positioned closest to said holding area and the smallest openings positioned at the apex of said sifting area.

10. A method for cleaning a litter pan using an integrated single component holder/sifter comprising a holding area and a sifting area positioned adjacent to each other, said method comprising the steps of:

positioning said integrated single component holder/sifter adjacent to said litter pan;

emptying contaminated litter from said litter pan into said holding area;

positioning the emptied litter pan adjacent to said integrated single component holder/sifter;

lifting said integrated single component holder/sifter over the emptied litter pan;

tilting said integrated single component holder/sifter so that contaminated litter held in said holding area moves into said sifting area and sifted litter falls through said sifting area into the emptied litter pan.

* * * * *